US008681151B2

(12) United States Patent
Coombe et al.

(10) Patent No.: US 8,681,151 B2
(45) Date of Patent: Mar. 25, 2014

(54) RENDERING AND NAVIGATING PHOTOGRAPHIC PANORAMAS WITH DEPTH INFORMATION IN A GEOGRAPHIC INFORMATION SYSTEM

(75) Inventors: Greg Coombe, San Francisco, CA (US); Daniel Barcay, San Francisco, CA (US); Gokul Varadhan, San Francisco, CA (US); Francois Bailly, Mountain View, CA (US)

(73) Assignee: Google Inc., Mountain View, CA (US)

( * ) Notice: Subject to any disclaimer, the term of this patent is extended or adjusted under 35 U.S.C. 154(b) by 90 days.

(21) Appl. No.: 13/302,479

(22) Filed: Nov. 22, 2011

(65) Prior Publication Data

US 2012/0299920 A1    Nov. 29, 2012

Related U.S. Application Data

(60) Provisional application No. 61/417,111, filed on Nov. 24, 2010.

(51) Int. Cl.
*G06T 15/30* (2011.01)
*G06T 17/20* (2006.01)
*G09G 5/00* (2006.01)

(52) U.S. Cl.
USPC .......................................... 345/423; 345/629

(58) Field of Classification Search
USPC ........................................................ 345/423
See application file for complete search history.

(56) References Cited

U.S. PATENT DOCUMENTS

2008/0291217 A1* 11/2008 Vincent et al. ............... 345/629
2010/0315411 A1* 12/2010 Chen et al. ................... 345/419
2012/0105581 A1*  5/2012 Berestov et al. ............... 348/43

OTHER PUBLICATIONS

Li, Frederick WB, Rynson WH Lau, and Danny Kilis. "GameOD: an internet based game-on-demand framework." Proceedings of the ACM symposium on Virtual reality software and technology. ACM, 2004.*
Velho, Luiz, Luiz Henrique De Figueiredo, and Jonas Gomes. "A unified approach for hierarchical adaptive tesselation of surfaces." ACM Transactions on Graphics (TOG) 18.4 (1999): 329-360.*
Stamos, Ioannis, and P. E. Allen. "3-D model construction using range and image data." Computer Vision and Pattern Recognition, 2000. Proceedings. IEEE Conference on. vol. 1. IEEE, 2000.*
Li, F., et al., "GameOD: An Internet Based Game-On-Demand Framework," *ACM Symposium on Virtual Reality Software and Technology*, 129-136, ACM, U.S. (2004).
Velho, L., et al., "A Unified Approach for Hierarchical Adaptive Tesselation of Surfaces," *ACM Transactions on Graphics*, vol. 18, No. 4, 329-360, ACM, U.S. (Oct. 1999).
International Search Report for International Application No. PCT/US2011/061890, European Patent Office, Netherlands, mailed on Feb. 16, 2012.

\* cited by examiner

*Primary Examiner* — Aaron M Richer
*Assistant Examiner* — Vu Nguyen
(74) *Attorney, Agent, or Firm* — Dority & Manning, P.A.

(57) ABSTRACT

The capability to render and navigate three-dimensional panoramic images in a virtual three-dimensional environment so as to create an immersive three-dimensional experience is provided. Such a capability can present a three-dimensional photographic experience of the real world that is seamlessly integrated with the virtual three-dimensional environment. Depth values associated with the panoramic images may be used to create three-dimensional geometry, which can be rendered as part of the virtual three-dimensional environment. Further, such a capability can enable a user to roam freely through the environment while providing a more natural free-form exploration of the environment than existing systems.

34 Claims, 8 Drawing Sheets

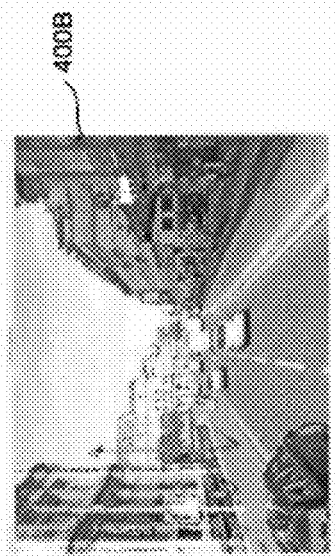
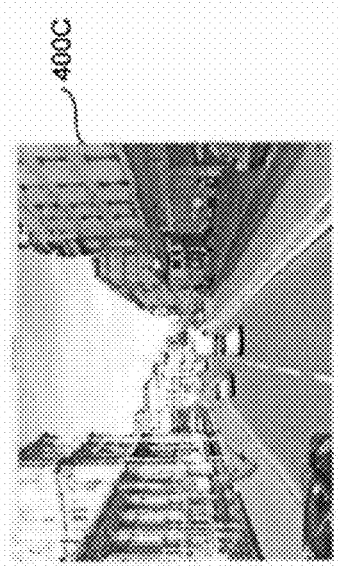
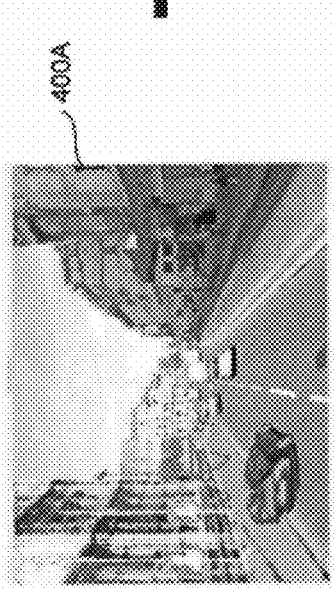
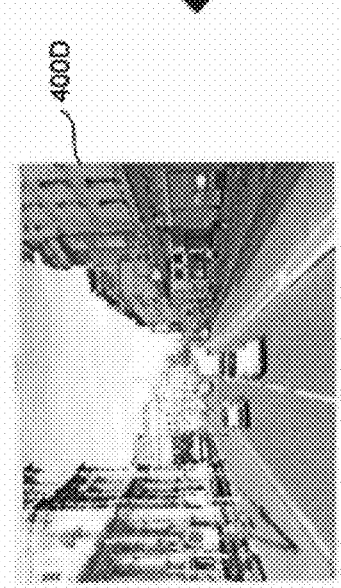

RENDERING AND NAVIGATING PHOTOGRAPHIC PANORAMAS WITH DEPTH INFORMATION IN A GEOGRAPHIC INFORMATION SYSTEM

CROSS REFERENCE TO RELATED APPLICATIONS

This patent application claims the benefit of U.S. Provisional Patent Application No. 61/417,111, filed Nov. 24, 2010, entitled "Rendering and Navigating Photographic Panoramas with Depth Information in a Geographic Information System" which is incorporated herein by reference in its entirety.

BACKGROUND

1. Field

Embodiments relate generally to geographic information systems.

2. Background

A geographic information system (GIS) is a system for archiving, retrieving, displaying or manipulating data indexed according to the data elements' geographic coordinates. The data elements may be a variety of data types such as, for example, satellite imagery, maps, models of buildings and terrain, and other geographic features. Further, data elements may include geo-located photographs of real world scenes corresponding to various geographic locations. For example, the geo-located photographs may correspond to a network of streets of a major metropolitan city. Such photographs may also include panoramic images. The photographs may then be rendered to a display using a substantially spherical model of the Earth.

However, the use of the spherical model to render the photographs permit the photographs to be viewed from only one position. This is particularly due to a lack of three-dimensional information associated with the photographs. Further, GIS data cannot be incorporated for purposes of transitioning from one photograph to the next as the substantially spherical model does not correspond to the actual geometry of the Earth.

BRIEF SUMMARY

The capability to render and navigate three-dimensional panoramic images in a virtual three-dimensional environment so as to create an immersive three-dimensional experience is provided. Such a capability can present a three-dimensional photographic experience of the real world that is seamlessly integrated with the virtual three-dimensional environment. Depth values associated with the panoramic images may be used to create three-dimensional geometry, which can be rendered as part of the virtual three-dimensional environment. Further, such a capability can enable a user to roam freely through the environment while providing a more natural free-form exploration of the environment than existing systems.

In an embodiment, a first panoramic image associated with a geographic location is retrieved. The first panoramic image has metadata, which includes a link to one or more panoramic images associated with another geographic location. A depth map associated with the first panoramic image is also retrieved based on additional information included in the metadata. The depth map of the first panoramic image includes depth values. Each depth value is associated a portion of the first panoramic image, such as a pixel or region of pixels, to model content of the first panoramic image. A three-dimensional mesh of polygons is generated for the first panoramic image based on the retrieved depth map. At least a portion of the panoramic image is projected onto the generated three-dimensional mesh of polygons to form a three-dimensional model of the first panoramic image. The three-dimensional model is then rendered at a first level of detail within a three-dimensional environment based on a current field of view associated with a viewport, which displays the three-dimensional environment from the perspective of a virtual camera.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. J is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIGS. 4A-D show exemplary image frames rendered using textured 3D meshes in a 3D environment, according to an embodiment.

Figure 5:
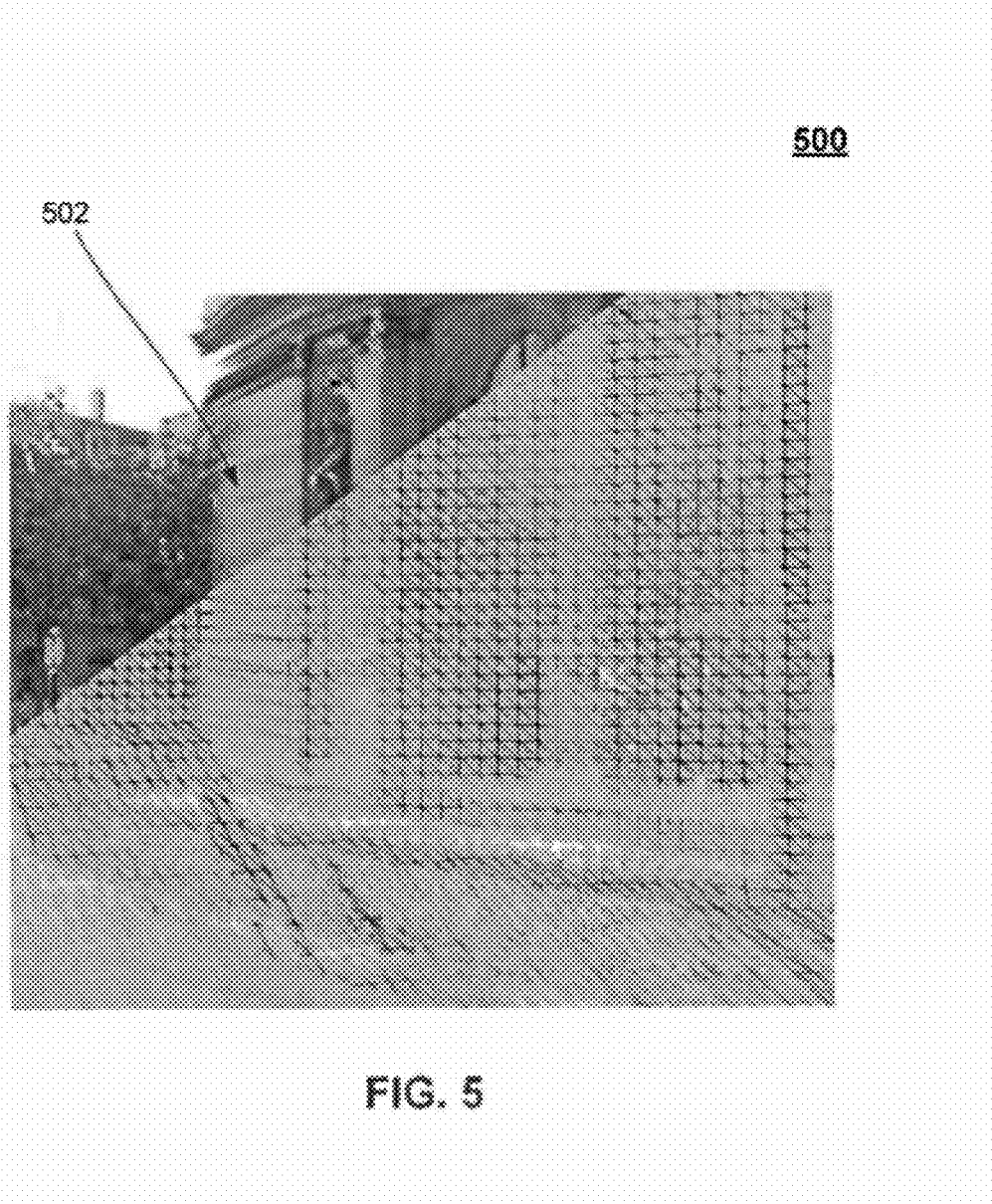

FIG. 5 is an image showing an example of a type of visual artifact along the edge of a building rendered using a textured 3D mesh, according to an embodiment.

Figure 6:
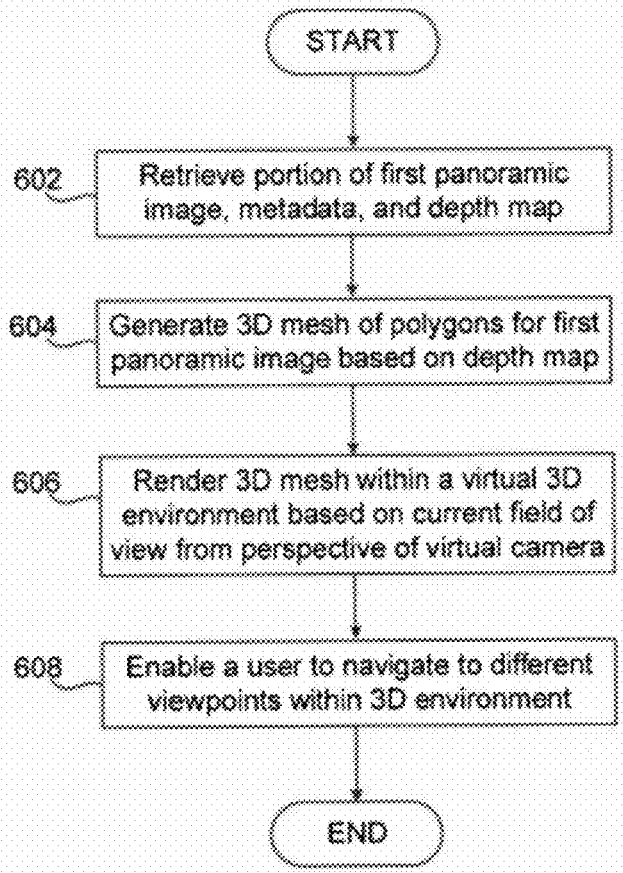

FIG. 6 is a flowchart of an exemplary method for rendering and navigating panoramas within a three-dimensional virtual environment, according to an embodiment.

Figure 7:
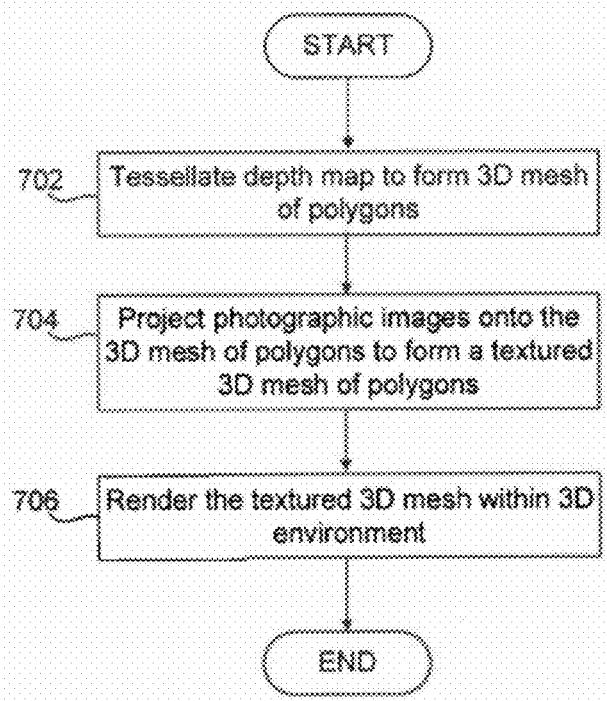

FIG. 7 is a flowchart of an exemplary method for rendering a 3D mesh of polygons for a panoramic image based on an image depth map, according to an embodiment.

Figure 8:
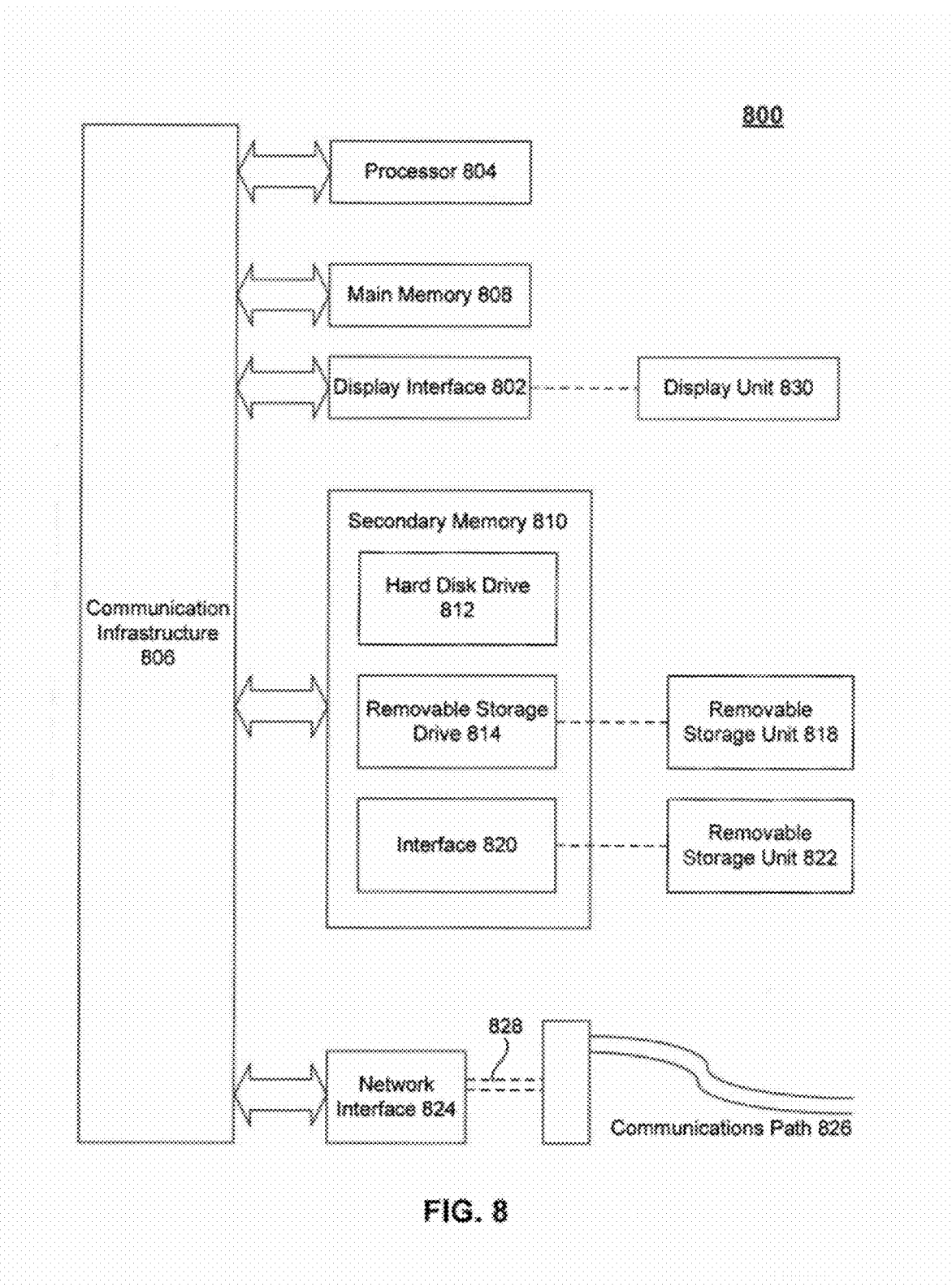

FIG. 8 illustrates an example computer system in which embodiments can be implemented.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Embodiments relate to rendering and navigating photographic panoramas in an interactive virtual three-dimensional environment. While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "panoramic image" and "panorama" may, for example, refer to any panoramic image that provide a 360-degree view of a real world scene. Panoramas or panoramic images may be stored in the form of a plurality of panoramic images or panoramic image tiles. Such panoramas may further include three-dimensional images, including panoramic three-dimensional images that can be presented on a display. Such a display can be any type of electronic display for viewing images or can be any type of rendering device adapted to view three-dimensional images. A panorama may also have an associated geometry, which may define how to render the panorama in three dimensional space. To render the panorama, the panorama may be texture-mapped to its associated geometry. In a example, the geometry may be a sphere or cylinder. In another example, the geometry may be a depth map specifying the depth of corresponding pixels or regions of the panorama.

System

Figure 1:
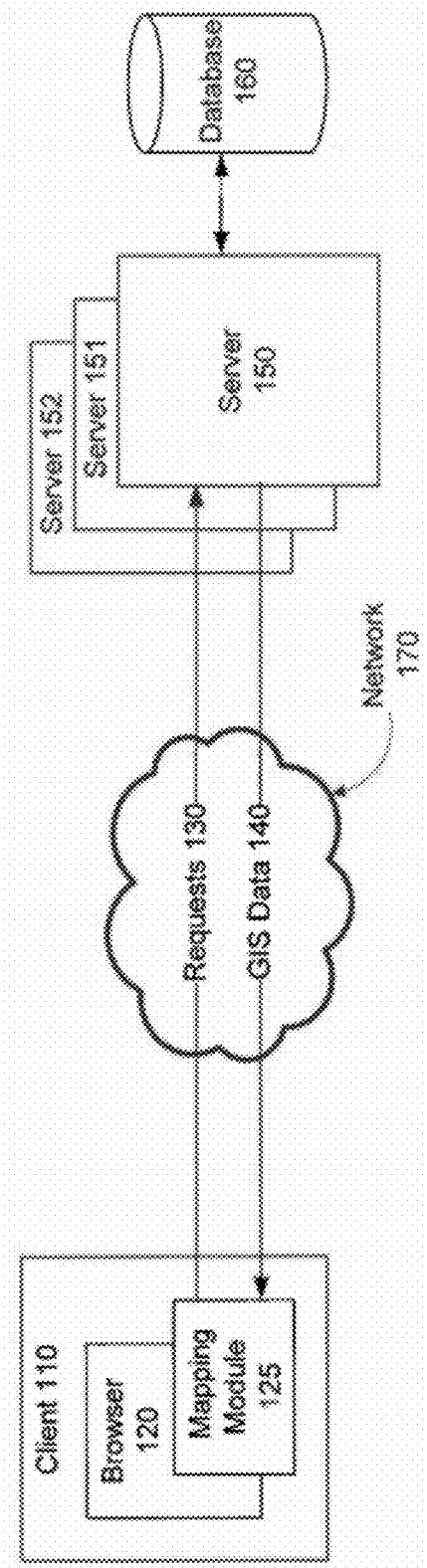
FIG. 1 is a diagram of an exemplary GIS suitable for practicing an embodiment.

Embodiments, as described herein, can be implemented in a GIS to render and navigate photographic panoramas in a virtual three-dimensional (3D) environment. In an example, such a GIS can be configured to operate in a client-server computer architecture, as illustrated in FIG. 1, described below. An example of such a GIS includes, but is not limited to, Google Earth from Google Inc. of Mountain View, Calif.

FIG. 1 is a diagram of an exemplary GIS system 100 suitable for practicing an embodiment. In the example shown in FIG. 1, system 100 includes a client 110, requests 130, GIS data 140, servers 150-152, a database 160, and a network 170. Client 110 includes a browser 120, which implements a mapping module 125, according to an embodiment. According to an embodiment, system 100 may be a GIS configured in a client-server architecture, as noted above.

Client 110 communicates with one or more servers 150, for example, across network 170. Although only servers 150-152 are shown, more servers may be used as necessary. Network 170 can be any network or combination of networks that can carry data communication. Such network can include, but is not limited to, a local area network, medium area network, and/or wide area network such as the Internet. Client 110 can be a general-purpose computer with a processor, local memory, a display, and one or more input devices (e.g., a mouse, QWERTY keyboard, touch-screen, microphone, joystick, or T9 keyboard). Such computing device can include, but is not limited to, a mobile phone, a personal digital assistant (PDA), a computer, a cluster of computers, a set-top box, or other similar type of device capable of processing instructions. Servers 150-152, similarly, can be implemented using any general-purpose computer capable of serving data to client 110. Although only servers 150-152 are shown, additional servers may be used as necessary.

In an embodiment, one or more of servers 150-152 (hereinafter "server(s) 150") are GIS servers that serve GIS data 140 to client 110 over network 170 based on requests 130 sent by browser 120. Browser 120 can be a geospatial browser configured to provide an interface to the GIS. Such a geospatial browser can be a standalone client application executable by client 110 or operable as a plug-in of an web or Internet browser.

In an example, server(s) 150 receive requests 130 from browser 120 to transmit GIS data 140 corresponding to a geographic region of interest on the spherical surface. For example, a request may include a bounded geographic search area in the form of a bounding box having latitude/longitude data points associated with the geographic region of interest on the spherical surface. In response to receiving the request, server(s) 150 may communicate with database 160 to retrieve GIS data 140 corresponding to the region of interest. GIS data 140 can include image data such as, for example, satellite imagery, digital maps, aerial photographs, street-level photographs. Further, the street-level photographs may include three-dimensional panoramic images.

Although not shown in FIG. 1, server(s) 150 may also communicate with one or more content servers over network 170. For example, server(s) 150 may send requests to a map database and/or map server for retrieving portions of GIS data 140. For example, GIS data 140 may include map data including, but not limited to, elevation data, longitude/latitude data, and GPS coordinates. The provided map data can be stored in, for example, a database of map information communicatively coupled to server(s) 150. Alternatively, or in addition to, one or more third-party map data services can be used to provide the map data to server(s) 150.

In an embodiment, server(s) 150 determines descriptive features associated with the geographic (i.e., latitude/longitude) data points that should be displayed and generates a compressed file in a Keyhole Markup Language (KML), which may be referred to as a "KMZ" file. The KML may include description of user-generated overlays of GIS data, in a language such as KML. These kinds of overlays include, but are not limited to: geolocated icons, geolocated image overlays to be draped over the depth-image, lines, polygons, tracks, and tours. The KML language allows users to generate their own content, and position it in 3D. This markup can be shared across the GIS system and this new rendering technique. Such descriptive features may be stored as map layer data in database 160 or some other storage location accessible to server(s) 150. The map layer data may include, for example, a database of restaurants, museums, national monuments, and/or other places of interest. Server(s) 150 may then transmit both images (e.g., in the form of image tiles) in addition to descriptive features corresponding to the latitude/longitude data points within the bounding box over network 170. Additional details of KML and KMZ files would be apparent to a person skilled in the relevant art given this description.

Moreover, KML may also enable a user to specify a tour. Tours enable scripted camera motion through the panoramas and other GIS data. The KML language allows users to encode for flight-paths through the environment, and as such, the system for choosing which panoramas to fetch, process and render must be decoupled from user-input, to allow for scripted camera motion to trigger panorama changes, etc.

In an embodiment, browser 120 can implement mapping module 125 to render and navigate GIS data 140 in a 3D environment that includes a three dimensional model of the Earth. As will be described in further detail below, GIS data 140 can be used to render and display street level panoramic images in a display area of a graphical user interface (GUI) of browser 120 from the perspective of a virtual camera.

Example GUI

Figure 2:
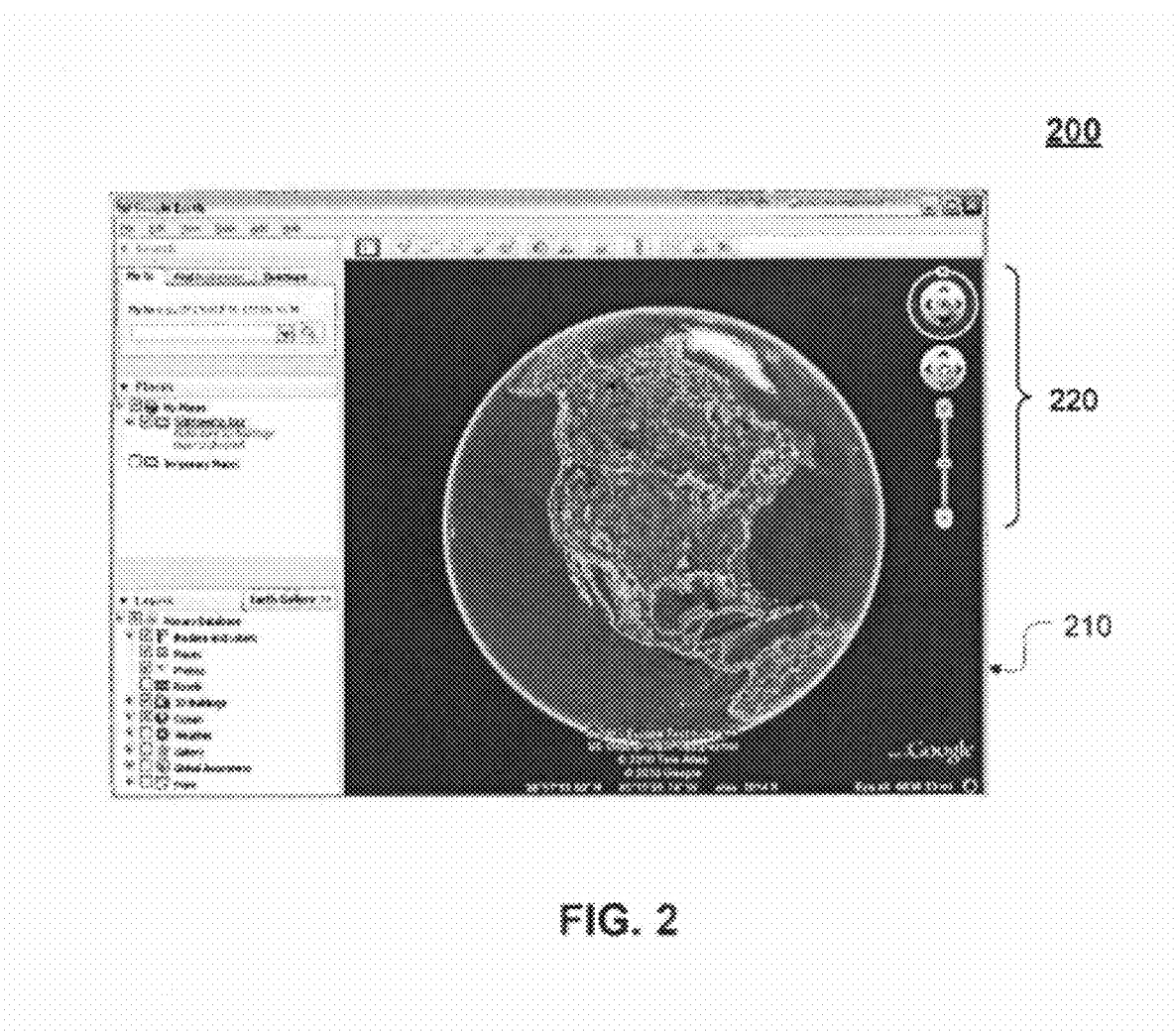
FIG. 2 is an exemplary user interface of the GIS, according to an embodiment.

FIG. 2 shows an exemplary GUI 200 of a geospatial browser (e.g., browser 120 of FIG. 1, described above), according to an embodiment. In the example shown in FIG. 2, geographic data is shown in a display area 210. In an embodiment, display area 210 uses a viewport embedded within the geospatial browser to present the geographic data from the perspective of a virtual camera. In an embodiment, the perspective is defined by a view frustum such as, for example, a truncated three-dimensional pyramid. Geographic data within the view frustum can be displayed at varying levels of detail depending on its distance from the virtual camera. Example geographic data displayed in display area 210 includes images of the Earth. It is noted that images of other planets (e.g., Mars) and/or celestial bodies (e.g., the Moon) may also be displayed in display area 210. For example, these images can be rendered onto a geometry representing the Earth's terrain creating a three dimensional model of the Earth. Other data that may be displayed include three dimensional models of buildings corresponding to city blocks.

User interface 200 includes controls 220 for changing the virtual camera's orientation. Controls 220 enable a user to change, for example, the virtual camera's altitude, latitude, longitude, pitch, yaw and roll. In an embodiment, controls 220 are manipulated using a computer pointing device such as a mouse. As the virtual camera's orientation changes, the virtual camera's frustum and the geographic information/data displayed also change. In addition to controls 220, a user can also control the virtual camera's orientation using other computer input devices such as, for example, a computer keyboard or a joystick.

In the example shown, the virtual camera has an aerial perspective of the Earth. In an embodiment, the user may select a target corresponding to a geographical location on the Earth by selecting an appropriate position within display area 210. The virtual camera may then incrementally zoom down to a lower altitude based on the selected target. A threshold altitude near ground-level may be reached that can be used to infer that the user intends to view ground-level objects up close. For example, near ground-level, where satellite imagery may become blurry or less useful, several factors may be taken into account to infer such user intent. Such factors can include, but are not limited to, proximity to the ground, the motion of the virtual camera, and user input (e.g., mouse movements).

In an embodiment, display area 210 can be used to display street level images associated with a geographical location. For example, the street level images may comprise photographs of buildings and other features that are presented to a user from a street level perspective (e.g., a person walking on the street at the geographic location) as compared to a top-down aerial perspective. Further, street level images are panoramic images such as, for example, 360-degree panoramas centered at the geographic location associated with an image. In an embodiment, each panoramic street level image may comprise a plurality of photographs representing different perspectives from a geographical vantage point.

In an embodiment, controls 220 may be automatically updated once the threshold altitude, as described above, is reached so as to provide a visual indicator, such as a control button, for enabling ground level navigation that, when selected, changes the appearance of displayed aerial satellite imagery in areas where panorama data is available. For example, streets with available panorama data may be highlighted. In addition, updated controls 220 may enable the user to activate a street level view of the geographic location in display area 210 by further selecting a point on the image. When a point is selected by the user, a character or avatar icon can be displayed in the image at the point.

In a further embodiment, the avatar icon can include an indicator of which direction the avatar icon is facing. The viewing direction and orientation of the virtual camera and thus, the visual representation of the panorama within the viewport, can be configured to match the orientation of the avatar icon. In an embodiment, the viewport of display area 210 presents a panoramic image of the selected geographic area. The user can click and drag (e.g., using an input device such as a mouse) the image directly within display area 210 in order to change the viewing direction of the virtual camera so as to look around 360 degrees. Controls 220 can be used as navigation controls or inputs in order to, for example, zoom and pan within the three-dimensional virtual environment.

Example Mapping Module

Figure 3:
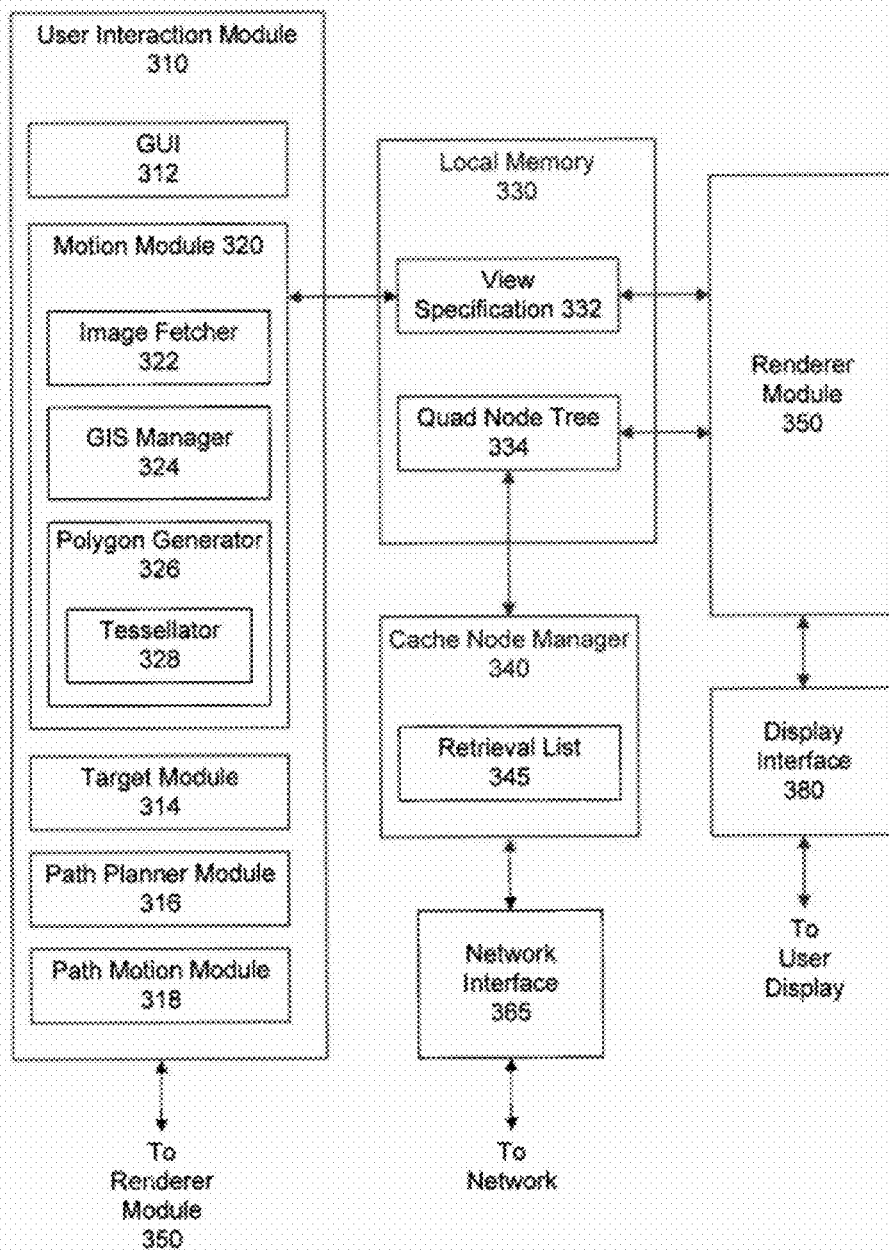
FIG. 3 is an exemplary mapping module in the GIS for rendering and navigating photographic panoramas within a 3D environment, according to an embodiment.

FIG. 3 is an architecture diagram of an exemplary mapping module 300 of a GIS, according to an embodiment. For ease of explanation, mapping module 300 will be described with respect to GIS system 100 of FIG. 1, as described above. For example, mapping module 300 may be used to implement mapping module 125 of browser 120 of system 100. However, embodiments are not intended to be limited thereto.

In an embodiment, mapping module 300 includes a user interaction module 310, a GUI 312, a target module 314, a path planner module 316, a path motion module 318, a motion module 320, a local memory 330, a cache node manager 340, a rendering module 350, a network interface 365, and a display interface 380. In an embodiment, cache node manager 340 includes an image fetcher 322 and retrieval list 345. In an alternative embodiment, image fetcher 322 may be included in renderer module 350. Renderer module 350 includes a GIS manager 324, polygon generator 326, and tessellator 328. Local memory 330 includes a view specification 332 and quad node tree 334. Cache node manager 340 includes a retrieval list 345.

In an embodiment, the components of mapping module 300 can be implemented, for example, as software running on a client machine. Mapping module 300 interacts with one or more GIS servers (e.g., server(s) 150 of FIG. 1, as described above) to retrieve images of the Earth and other geospatial information/data for viewing by a user. Together, the images of the Earth and other geospatial data form a three dimensional model in a three dimensional environment. In an embodiment, software objects are grouped according to functions that can run asynchronously (e.g., time independently) from one another.

In general, mapping module 300 operates as follows. User interaction module 310 receives user input regarding a location that a user desires to view and, through motion module 320, constructs view specification 332. Rendering engine 350 uses view specification 332 to decide what data is to be drawn and draws the data. Cache node manager 340 runs in an asynchronous thread of control and builds a quad node tree 334 by populating it with quad nodes retrieved from a remote server via a network (e.g., network 170 of FIG. 1, as described above).

In an embodiment of user interface module 310, a user inputs location information using GUI 312. For example, GUI 312 may be implemented using GUI 200 of FIG. 2, as described above. The user input results, for example, in the generation of view specification 332. View specification 332 can be placed in local memory 330, where it is used by rendering engine 350.

Motion module 320 uses location information received via GUI 312 to adjust the position and/or orientation of a virtual camera. In an embodiment, motion module 320 constructs view specification 332, as noted above. The virtual camera is used, for example, for viewing a displayed three-dimensional model of the Earth in a three-dimensional environment. A user may view a displayed three dimensional model on a display device (e.g., a CRT computer monitor or LCD screen) from the standpoint of the virtual camera. In an embodiment, motion module 320 also determines view specification 332 based on the position of the virtual camera, the orientation of the virtual camera, and the horizontal and vertical fields of view of the virtual camera.

View specification 332 defines the virtual camera's viewable volume within a three dimensional space. In an embodiment, the viewable volume may be a view frustum (or simply "frustum"), and the position and orientation of the frustum with respect, for example, to a three dimensional map. In an embodiment, the frustum is in the shape of a truncated pyramid, as mentioned above. The frustum has minimum and maximum view distances that can change depending on the current field of view. As a user's view of a three dimensional map is manipulated using GUI 312, the orientation and position of the frustum changes with respect to the 3D virtual environment. Thus, as user input is received, view specification 332 changes. As noted above, view specification 332 is placed in local memory 330, where it is used by renderer module 350.

In an embodiment, renderer module 350 draws data from the perspective of the virtual camera, as described above. Also as described above, the virtual camera's perspective represents the viewpoint of the user viewing content on a display, such as, for example, an LCD display screen. Content information corresponding to the GIS data can be displayed at varying levels of details depending on its distance from the virtual camera. Such content information may comprise any type of digital media content including, but not limited to, imagery of real-world scenes captured from a video camera or computer-generated imagery, such as, for example, imagery of virtual scenes from a video game.

In an embodiment, the user can manipulate the user's viewpoint of the frustum using an input device, such as, for example, a joystick or track-pad. In an embodiment, user interaction module 310 receives the user input and sends it directly to renderer module 350. Based on the received user input from user input module 210, renderer module 350 changes, in real-time, the orientation and position of the frustum. Further, renderer module 350 can use a model-view matrix (or simply "view matrix") to specify the position and orientation of objects within the viewable content area with respect to the virtual camera. For example, the objects may be digital models of objects within a scene represented in a street level image. The virtual camera also has a position and orientation in three-dimensional space that is used as a reference point to create the view matix that will be applied to the models or objects in the scene. The view matrix translates and rotates objects to place them in three-dimensional space relative to the virtual camera, where the camera is at the origin. A person skilled in the relevant art given this detailed description would appreciate that any of a number of various ways can be used to create a view matrix for a media frame.

In accordance with one embodiment, view specification 332 specifies parameters of the virtual camera from the model-view matrix of the current 3D model to be drawn. Such camera parameters generally specify the position and orientation of the virtual camera in three-dimensional space. Such parameters can include, but are not limited to, directional coordinates, (e.g., latitude, longitude, north, south, in-between), altitude and pitch/tilt (e.g., level, down, up, in-between), yaw/roll (e.g., level, tilt clockwise, tilt counterclockwise, in-between), horizontal field of view, and vertical field of view.

In one example operation, and with the above camera parameters in mind, assume the user presses the left-arrow (or right-arrow) key. This would signal motion module 320 that the view should move left (or right). Motion module 320 implements such a ground level "pan the camera" type of control by adding (or subtracting) a small value (e.g., one degree per arrow key press) to the heading angle. Similarly, to move the virtual camera forward, the motion module 320 would change the X, Y, Z coordinates of the virtual camera's position by first computing a unit-length vector along the view direction (HPR) and adding the X, Y, Z sub-components of this vector to the camera's position after scaling each sub-component by the desired speed of motion. In these and similar ways, motion module 320 adjusts view specification 332 by incrementally updating XYZ and HPR to define the new view position "just after a move." In this way, motion module 320 is responsible for navigating the virtual camera through the three dimensional environment.

According to an embodiment, a set of panoramic images is retrieved from the server(s) based on a current field of view associated with a virtual three-dimensional (3D) environment used by the GIS to display images of real world scenes. As will be described in further detail below, depth values associated with each panoramic image can be used to create 3D geometry for each image. The 3D geometry may be, for example and without limitation, a coarse mesh of polygons (e.g., triangles) that can be rendered with photographic textures in the virtual 3D environment. In an embodiment, the depth information and the photographic textures associated with each panoramic image may be streamed from one or more server(s) (e.g., server(s) 150 of FIG. 1, as described above) to a client (e.g., client 110 of FIG. 1, as described above) in which mapping module 300 is implemented over a network (e.g., network 170 of FIG. 1, as described above).

In an embodiment, image fetcher 322 is operable to retrieve the set of panoramic image associated with geographic locations within the GIS. For example, a geographic location may correspond to a point selected by the user on a map displayed in the display area of a geospatial browser, as described above. Further, the panoramas may include latitude/longitude information, GPS coordinates, and/or other geographic data corresponding a particular geographic location. Image fetcher 322 may communicate with the server(s) over the network to retrieve the panoramic images and any information associated with the panoramic images. It is noted that the panoramic images may also be stored in a memory of the client. Image fetcher 322 may then retrieve the stored panoramic image from memory as necessary. In an alternative embodiment, image fetcher 322 may be implemented in renderer module 350.

In an embodiment, each panoramic image is stored as a multi-resolution hierarchy of image tiles. In an embodiment, the multi-resolution hierarchy of image tiles may include a hierarchy of images corresponding to the panoramic image with increasing levels of detail. Images of different levels of resolution are subdivided into a series of sub-images or "tile" data objects. In an example, three different copies of an image with a high level of detail (e.g., 1024 pixels) may be divided into a different number of tiles representing different levels of detail. The resolution of each set of tiles can be re-sampled such that each tile has the same number of pixels. The sets of tiles derived from the three different image copies may be used to define regions at different levels of specificity. Additional aspects of such multi-resolution image tiles would be apparent to a person skilled in the relevant art given this description.

In an embodiment, image tiles may be retrieved by image fetcher 322 for the panoramic image to be rendered. The rendered or to be rendered panoramic image may be referred to herein as the "active" panoramic image or panorama. In addition, image fetcher 322 may also retrieve (or "pre-fetch") image tiles for panoramic images that correspond to geographic locations that neighbor or are in close proximity to the geographic location of the active panoramic image. Such pre-fetched panoramas may be referred to herein as "neighboring" panoramic images or panoramas. In an embodiment, the image tiles retrieved for the active panorama are at a higher resolution than those of the neighboring panoramas. Lower-resolution image tiles may be retrieved for neighboring panoramas since they may not necessarily be rendered. This is also helps to reduce latency and the amount of memory required to store such images, as the lower-resolution images have a smaller file size than higher-resolution tiles.

As a feature, in the case where there exists large amounts of excess bandwidth and computational power on both the client and server sides, it may be desirable to prefetch adjacent panoramas at full resolution to further reduce fetching time and scene resolving artifacts like popping. However, a tradeoff of fetching panoramas at full resolution is that the network traffic and server effort may be wasted if these panoramas are never viewed. To optimize this tradeoff, a heuristic that determines the probability that a panorama will be viewed may be used. Additionally or alternatively, a heuristic that determines the likely order in which the panoramas will need to be fetched may be used. Using the first heuristic, one embodiment reduces the resolution of the panoramas that are prefetched based on the probability heuristic. Additionally, the prefetches are sequenced (due to limited bandwidth) according to the use-order heuristic.

These two related heuristics: "viewing probability" and "view order" may be constructed by looking at the graph-theoretic depth from the currently active panorama (i.e. how many links distant), and the relationship between the camera orientation and the direction of travel towards those other panoramas. For example, a panorama one link away is more likely to be needed than a panorama that is two links away. Likewise, a panorama that is in the view direction is more likely to be needed than one behind the user.

As noted above, each panoramic image can be associated with depth information corresponding to image objects at various points within a scene represented by the image, according to an embodiment. The depth information can include, for example, depth values that describe the proximity of an image object to a first position. The first position can be, for example, the position of a camera used to capture the image. In an embodiment, the surface of the image object may be represented as a collection of points. Each point, in turn, may be represented as a vector, whereby each point is stored with respect to its distance to the camera, and its angle with respect to the direction in which the camera is pointed.

The depth information may be collected in a variety of ways, including, but not limited to, using a laser range finder and image matching. In an embodiment, camera arrangements employing two or more cameras, spaced slightly apart yet looking at the same scene may be used. According to an embodiment, image matching is used to analyze slight differences between the images captured by each camera in order to determine the distance at each point in the images. In another embodiment, the distance information may be compiled by using a single video camera, mounted on a vehicle and traveling at a particular velocity, to capture images of scenes as the vehicle moves forward. A laser range finder may also be used in combination with the camera taking the image. By using image matching, the subsequent frames of the captured images may be compared to extract the different distances between the objects and the camera. For example, image objects located at a further distance from the camera position will stay in the frame longer than image objects located closer to the camera position.

Although some formats may be more advantageous than others, embodiments are not limited to any particular format of storing the depth information. In an embodiment, the depth information is sent from a server as a depth map comprising a grid of discrete values, where each element of the grid corresponds with a pixel of a two-dimensional image. The value of the depth map at each pixel may represent the distance from a first position to an image object. For example, the value of the depth map at each pixel may represent the distance from a camera position, of the camera used to capture the image, and the image object represented in the image. It would be apparent to a person skilled in the relevant art given this description that any one of various file formats may be used for such a depth map. For example, the depth map may be stored as an extensible markup language (XML) file. In an embodiment, the depth map and other information associated with the panoramic image can be stored independently of the image itself.

In an embodiment, polygon generator 326 generates a three-dimensional mesh of polygons (e.g., triangles) for a panoramic image based on a depth map associated with the panoramic image. In an embodiment, polygon generator 326 uses tessellator 328 to tessellate a 3D model corresponding to the panoramic image with polygon geometry having depth values at each vertex. The density of the three-dimensional mesh may be generated so as to match the density of the depth map (e.g., 53×256).

In an embodiment, tessellator 328 uniformly tessellates the depth map to form the three-dimensional mesh of polygons. In alternative embodiment, tessellator 328 adaptively tessellates the depth map according to one or more properties associated with object surfaces represented by the geometry of the 3D model. For example, the object surfaces may correspond to image objects in the scene represented by the panoramic image. Such properties may include, but are not limited to, planarity and size of a given surface. An advantage of such an embodiment is improved rendering performance on low-power computing devices (e.g., laptops or mobile devices).

In an embodiment, renderer module 350 renders a textured version of the 3D mesh using photographic textures based on the active panorama to be rendered in the 3D environment. In an embodiment, renderer module 350 projects image tiles associated with the active panoramic image onto the 3D mesh. As described above, the image tiles may be stored at various resolution levels. Therefore, the textured 3D mesh can be rendered at various resolution levels by renderer module 350, according to an embodiment. Further, the textured 3D mesh is rendered by renderer module 350 with the 3D environment displayed to the user via GUI 312. The operation of renderer module 350 is described in further detail below.

Instead of blending between multiple images to generate novel viewpoints as in convention image-based rendering approaches, the 3D geometry is used to generate a warped view of a single panoramic image. This more faithfully reproduces the scene (e.g., by not blending between mis-registered pixels) and maintains context while the virtual camera is in motion within the 3D environment through correct parallax. In addition, as the virtual camera transitions to a new panorama, renderer module 350 is configured to fade between the panoramas over a short time period, which prevents the user from seeing two blended images.

In an embodiment, information associated with each panoramic image also includes metadata. The metadata may be used to specify information associated with a panoramic image including, but not limited to, a position of a camera (e.g., yaw, pitch, and roll), GPS coordinates, and an panorama identifier (e.g., a string value that identifies the panorama in the GIS). In an embodiment, the metadata of each panoramic image also includes connectivity information that specifies a link to one or more neighboring panoramas. In an embodiment, a directed graph of linked panoramas can be constructed based on the connectivity information included in the metadata of each panoramic image. Such a directed graph can then be used to guide a user of the GIS along these links.

In an example, such links correspond to a street network in the virtual 3D environment of the GIS and the panoramic images represent different street-level views along the streets of the network. In an embodiment, GUI 312 can be used to provide navigation controls to enable a user to navigate within the 3D environment between various locations and viewpoints associated with the panoramic images. For example, additional controls may be rendered as a three-dimensional overlay with the textured 3D model of the panoramic image. The three-dimensional overlay can include a navigation control that enables a user to change the virtual camera's position within the 3D environment to navigate between locations associated with the different panoramic images.

As described above, each panoramic image may be associated with a geographic location and may include a set of geographic coordinates (e.g., latitude/longitude coordinates) corresponding to the geographic location. In an embodiment, GIS manager 324 is configured to geo-locate each panoramic image within the GIS based on the geographic coordinates included in the metadata. Accordingly, the geographic coordinates associated with each panoramic image may be utilized such that movement in the virtual 3D environment can correspond to movement in the real world as depicted in the panoramic images.

In an embodiment, target module 314 determines a target location in the three-dimensional environment. In one embodiment, target module 314 accepts an input from a user that specifies a target location, such as an address or coordinates. In another embodiment, target module 314 may receive position data representing a position on a viewport selected by a user, extend a ray based on the position selected by the user, and determine the target location to be an intersection of the ray with an object in the three-dimensional model.

Path planner module 316 determines a path along a representation of a street in the three-dimensional environment. The path may span from a first position corresponding to an initial location of the virtual camera to a second position corresponding to the target location. Path planner module 316 determines the path to turn at an intersection in a representation of a street network in the three-dimensional environment. At the turn, path planner module 316 may interpolate a spline at the turn in the path to smooth motion of the virtual camera.

Path motion module 318 moves a virtual camera in the three-dimensional environment toward the target location along the path and orients the virtual camera to face the target location as the virtual camera moves along the path. Path motion module 318 may use the path to prefetch geographic information from a GIS server (e.g., server(s) 150 of FIG. 1, as described above).

According to an embodiment, the target module 314 automatically chooses the best possible panorama for a given viewpoint and view direction of the virtual camera in the 3D environment. Further, for areas in the 3D environment in which there may be little or no coverage, the viewpoints may be restricted to a smaller set of known-good regions. Such known-good regions may correspond to, for example, a camera position used to capture a particular panoramic image. For example, the known-good regions may tend to be near the centers of panoramas. In an embodiment, quad node tree 334 can be used on top of the directed graph of linked panoramas to spatially partition the panoramas. Quad node tree 334 can then be used to perform operations such as, for example, quickly finding the nearest panorama associated with a particular geographic location and the given viewpoint and view direction in the 3D environment, as noted above. Aspects of quad node tree 334 are described in further detail below.

FIGS. 4A-4D show exemplary image frames 400A-400D rendered using textured 3D meshes in a 3D environment, according to an embodiment. Each image frame corresponds to a different viewpoint within the 3D environment as a virtual camera is moved along a representation of a street. In this example, the virtual camera starts at 400A, proceeds to 400B, then to 400C, and stops at 400D. The 3D effect can be seen by comparing the relative motion of the foreground and background buildings in each frame as the virtual camera progresses from one frame to the next. In particular, the foreground buildings appear to move a much greater distance than the background buildings in the distance.

Further, to provide a smooth user experience over slow networks, the neighboring panoramas may be pre-fetched by image fetcher 322 using a breadth-first traversal of the panorama connectivity graph. As the user moves to the nearby panoramas (e.g., using navigation controls provided in GUI 312), the image and associated data may already be fetched by image fetcher 322. This allows switching between panoramas only after the resources associated with a panorama have been loaded, thereby preventing image "popping" as the images are rendered by renderer module 250. In addition, due to limited network bandwidth, image fetcher 322 may utilize a prioritization scheme for these fetches based on, for example, proximity, speed, and view direction of the virtual camera in the 3D environment.

In an embodiment, a neighboring panoramic image is automatically rendered in the 3D environment as the user moves along a path between the panoramic images. The path may be, for example, a representation of a street in the 3D environment. As noted above, image tiles for the neighboring panoramic image may be stored (e.g., in a cache memory) at a lower resolution. However, as the 3D mesh (e.g., also stored in the cache memory) generated for the neighboring panorama is rendered in the 3D environment, it may be textured with corresponding image tiles at higher resolutions. As noted previously, renderer module 350 can fade between rendered portions of the currently active panorama and the neighboring, or soon to be active, panorama such that the user is presented a visually smooth transition from one panorama to the next.

In an example, the panoramic image data may be streamed. Image fetcher 322 may maintain a metadata graph and stream portions of panoramic image data based on the metadata graph. The streaming may operate as follows. Image fetcher 322 ensures that the appropriate metadata has been fetched for nearby panoramas in the graph based on the position of the virtual camera as well as the ID of the currently rendering panorama. In one embodiment, image fetcher 322 traverses the connection metadata to a specified depth, ensuring that all position, connectivity, and other metadata has been fetched for all panoramas in the nearby vicinity of the graph. If image fetcher 322 crawls the graph and finds a panorama A with metadata indicating a connection to another panorama B. If the metadata has not yet been fetched for B, a request is generated and sent to the server. In another embodiment, the server provides a spatial query in the form of a tile. When a tile fetch is sent, the metadata for all panoramas inside that tile may be returned. In the update step, the camera position is examined, and the proximity to adjacent tiles is calculated. If the view is considered to be sufficiently proximal to one or more tiles, those tiles are requested from the server. When they return, the metadata is unpacked and added to the to the metadata graph maintained by image fetcher 322.

According to an embodiment, renderer module 350 has cycles corresponding to the display device's video refresh rate (e.g., 60 cycles per second). In one particular embodiment, renderer module 350 performs a cycle of (i) waking up, (ii) reading the view specification 332 that has been placed by motion module 320 in a data structure accessed by a renderer, (iii) traversing quad node tree 334 in local memory 330, and (iv) drawing drawable data contained in the quad nodes residing in quad node tree 334. The drawable data may be associated with a bounding box (e.g., a volume that contains the data or other such identifier). If present, the bounding box is inspected to see if the drawable data is potentially visible within view specification 332. Potentially visible data is drawn, while data known not to be visible is ignored. Thus, the renderer uses view specification 332 to determine whether the drawable payload of a quad node resident in quad node tree 334 is not to be drawn, as will now be more fully explained.

Initially, and in accordance with one embodiment of the present invention, there is no data within quad node tree 334 to draw, and renderer module 350 draws a star field by default (or other suitable default display imagery). Quad node tree 334 is the data source for the drawing that renderer 350 does except for this star field. Renderer module 350 traverses quad node tree 334 by attempting to access each quad node resident in quad node tree 334. Each quad node is a data structure that has up to four references and an optional payload of data. If a quad node's payload is drawable data, renderer module 350 will compare the bounding box of the payload (if any) against view specification 332, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, renderer module 350 also attempts to access each of the up to four references in the quad node. If a reference is to another quad node in local memory (e.g., memory 330 or other local memory), renderer module 350 will attempt to access any drawable data in that other quad node and also potentially attempt to access any of the up to four references in that other quad node. The renderer module's attempts to access each of the up to four references of a quad node are detected by the quad node itself.

As previously explained, a quad node is a data structure that may have a payload of data and up to four references to other files, each of which in turn may be a quad node. The files referenced by a quad node are referred to herein as the children of that quad node, and the referencing quad node is referred to herein as the parent. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., on server(s) of the GIS), and there is no drawable data present on the user's computer.

Quad nodes and cache nodes have built-in accessor functions. As previously explained, the renderer module's attempts to access each of the up to four references of a quad node are detected by the quad node itself. Upon the renderer module's attempt to access a child quad node that has a filename but no corresponding address, the parent quad node places (e.g., by operation of its accessor function) that filename onto a cache node retrieval list 345. The cache node retrieval list comprises a list of information identifying cache nodes to be downloaded from a GIS server. If a child of a quad node has a local address that is not null, the renderer module 350 uses that address in local memory 330 to access the child quad node.

Quad nodes are configured so that those with drawable payloads may include within their payload a bounding box or other location identifier. Renderer module 350 performs a view frustum cull, which compares the bounding box/location identifier of the quad node payload (if present) with view specification 332. If the bounding box is completely disjoint from view specification 332 (e.g., none of the drawable data is within the frustum), the payload of drawable data will not be drawn, even though it was already retrieved from a GIS server and stored on the user's computer. Otherwise, the drawable data is drawn.

The view frustum cull determines whether or not the bounding box (if any) of the quad node payload is completely disjoint from view specification 332 before renderer module 350 traverses the children of that quad node. If the bounding box of the quad node is completely disjoint from view specification 332, renderer module 350 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from view specification 332.

Quad node and cache node payloads may contain data of various types. For example, cache node payloads can contain satellite images, text labels, political boundaries, 3 dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent.

The cache node manager 340 thread, and each of one or more network loader 365 threads, operate asynchronously from renderer module 350 and user interaction module 310. Renderer module 350 and user interaction module 310 can also operate asynchronously from each other. In some embodiments, as many as eight network loader 365 threads are independently executed, each operating asynchronously from renderer module 350 and user interaction module 310. The cache node manager 340 thread builds quad node tree 334 in local memory 330 by populating it with quad nodes retrieved from GIS server(s). Quad node tree 334 begins with a root node when the client system is launched or otherwise started. The root node contains a filename (but no corresponding address) and no data payload. As previously described, this root node uses a built-in accessor function to self-report to the cache node retrieval list 345 after it has been traversed by renderer module 350 for the first time.

In each network loader 365 thread, a network loader traverses the cache node retrieval list 345 (which in the embodiment shown in FIG. 3 is included in cache node manager 340, but can also be located in other places, such as the local memory 330 or other storage facility) and requests the next cache node from the GIS server(s) using the cache node's filename. The network loader only requests files that appear on the cache node retrieval list. Cache node manager 340 allocates space in local memory 330 (or other suitable storage facility) for the returned file, which is organized into one or more new quad nodes that are descendents of the parent quad node. Cache node manager 340 can also decrypt or decompress the data file returned from the GIS server(s), if necessary (e.g., to complement any encryption or compression on the server-side). Cache node manager 340 updates the parent quad node in quad node tree 334 with the address corresponding to the local memory 330 address for each newly constructed child quad node.

Upon its next traversal of quad node tree 334 and traversal of the updated parent quad node, renderer module 350 finds the address in local memory corresponding to the child quad node and can access the child quad node. This may be done separately and asynchronously in renderer module 350. The renderer's traversal of the child quad node progresses according to the same steps that are followed for the parent quad node. This continues through quad node tree 334 until a node is reached that is completely disjoint from view specification 332 or is considered inappropriate to draw based on other factors as previously explained.

In this particular embodiment, note that there is no communication between the cache node manager thread and renderer module 350 other than the renderer module's reading of the quad nodes written or otherwise provided by the cache node manager thread. Further note that, in this particular embodiment, cache nodes and thereby quad nodes continue to be downloaded until the children returned contain only payloads that are completely disjoint from view specification 332 or are otherwise unsuitable for drawing, as previously explained. Network interface 360 (e.g., a network interface card or transceiver) is configured to allow communications from the client to be sent over a network, and to allow communications from the remote server(s) to be received by the client. Likewise, display interface 380 (e.g., a display interface card) is configured to allow data from a mapping module to be sent to a display associated with the user's computer, so that the user can view the data. Each of network interface 360 and display interface 380 can be implemented with conventional technology.

Visual Artifacts

As noted above, it is possible that the panoramas used may present an accurate visual representation of a scene from only a single point-of-view (e.g., the original position of the camera used to capture the image). Consequently, locations outside this point may not be accurate. As the three-dimensional model may not be entirely accurate, pixels may be mapped onto surfaces with incorrect depth, thereby producing artifacts that may cause image objects to appear in warped or unusual ways. Recall that a depth map may only store distances from a position of the camera. Due to this formatting of the depth map, discontinuities may result from when the resulting three-dimensional model is viewed from perspectives other the perspective of the camera. These discontinuities may lead to artifacts. For example, to cover the discontinuities, artificial planes may be inserted. The artificial planes may not accurately represent the real-world and cause visual artifacts.

FIG. 5 is an image 500 showing an example of a type of visual artifact along the edge of a building rendered using a textured 3D mesh, according to an embodiment. In the example shown in FIG. 5, image 500 includes a cutaway to the wireframe to show the triangles 502 associated with inaccurate depth information corresponding to objects in an image. Visual artifacts, referred to herein as "skins," are due to triangles 502, which are created along the boundaries of depth discontinuities and then viewed from a different angle.

Referring back to FIG. 3, mapping module 300, including any combination or sub-combination of its components, can utilize several techniques to reduce or eliminate such artifacts. In an example, the image area corresponding to the artifacts can be filled with information from other cameras. In an embodiment, the panorama data may also include information about which panorama(s) has the best view of a particular spot. This data can be utilized so as to fetch the relevant panorama(s) and fill in the area containing the artifact. In another example, these areas may be treated as missing data. In this example, the edge may be tessellated with triangles and then clamped to the back plane. This example would require the skins be identified by, for example, applying a threshold to determine depth discontinuity. The foregoing examples are provided for illustrative purposes only and embodiments are not intended to be limited thereto. A person skilled in the art would appreciate that other techniques may be used to reduce or eliminate such image artifacts.

Method

FIG. 6 is a flowchart of an exemplary method 600 for rendering and navigating panoramas within a three-dimensional virtual environment, according to an embodiment. For ease of explanation, GIS system 100 of FIG. 1 and mapping module 300 of FIG. 3, as described above, will be used to describe method 600, but is not intended to be limited thereto. Method 600 begins with step 601 to determine which panorama to retrieve. The panorama may be determined based on the view position, a metadata graph, or both. For example, step 601 may include receiving a link to the first panorama from metadata corresponding to another previously loaded panorama, and identifying the linked panorama.

At step 602, a portion of a first panoramic image is received. As described above, the first panoramic image may be associated with a geographic location. Further, the panoramic image may include or be associated with metadata and a depth map. Also as described above, the metadata and depth map may be stored and retrieved separately from the panoramic image. Thus, step 602 may also include retrieving the metadata and the depth map associated with the panoramic image.

The metadata includes at least one link to one or more additional panoramic images. For example, the one or more additional panoramic images may be neighboring panoramas representing a street-level scene of a second geographic location in close proximity to the first geographic location associated with the first panoramic image. Further, the link between the panoramas may represent a street that connects the respective geographic locations associated with the first panoramic image and the one or more panoramic images.

In an embodiment, the panoramic image may be stored as a multi-resolution hierarchy of images, as described above. Thus, retrieving the first panoramic image in step 602 may also include, for example, retrieving a series of images grouped as tiles at various levels of detail to be rendered or displayed in a GUI (e.g., GUI 312 of mapping module 300, as shown in FIG. 3 and described above). The image tiles may be retrieved from one or more server(s) (e.g., server(s) 150 of FIG. 1, as described above) in a GIS over a network (e.g., network 170, as described above), as described above. In addition, the retrieved or fetched tiles may be stored, for example, a memory or other local storage location at a client device (e.g., client 110 of FIG. 1, as described above). Step 602 may be performed by, for example, image fetcher 322 of FIG. 3, as described above.

Method 600 then proceeds to step 604, in which a 3D mesh of polygons for the first panoramic image is generated based on the depth map associated with the first panoramic image. Step 604 may be performed by, for example, polygon generator 326 of FIG. 3, as described above. In step 606, the generated 3D mesh of polygons is rendered within a virtual 3D environment based on a current field of view from the perspective of a virtual camera. Step 606 may be performed by, for example, renderer module 350 of FIG. 3, as described above. The rendering of step 606 is described in greater detail with respect to FIG. 7.

FIG. 7 is a process flowchart of an exemplary method 700 for rendering a 3D mesh of polygons for a panoramic image based on an image depth map, according to an embodiment. Like method 600, for ease of explanation, method 700 will be described with respect to mapping module 300 of FIG. 3. Method 700 begins in step 702, in which the depth map associated with the panoramic image is tessellated to form a 3D mesh of polygons, as described above. Step 702 may be performed by, for example, tessellator 328 of FIG. 3, as described above. Method 700 then proceeds to step 704, which includes projecting photographic images associated with the panoramic image onto the 3D mesh of polygons to form a textured 3D mesh of polygons (i.e., a 3D model). The photographic images may be in the form of image tiles retrieved from a server via a network (as in step 602 of method 600, described above). Method 700 concludes in step 706, in which the textured 3D mesh is rendered within a 3D virtual environment. Steps 704 and 706 may be performed by, for example, renderer module 350 of FIG. 3, as described above.

Referring back to FIG. 6, once the textured 3D model is rendered in the 3D environment, method 600 can proceed to step 608, which includes enabling a user to navigate to different viewpoints of the rendered 3D model in the virtual 3D environment. For example, a GUI of a GIS used to present the 3D environment may include user navigation controls for enabling the user to travel along a representation of a street in the 3D environment in response to user input via the navigation controls.

Although not shown in FIG. 6, method 600 may include additional steps such as determining a path along a representation of the street in the 3D environment and moving a virtual camera along the determined path in response to user input. The virtual camera may be moved from a first position corresponding to a first location associated with first panoramic image to a second position corresponding to a second location associated with a neighboring panoramic image in the 3D environment. As described above, since the panoramic images may be geo-located, movement in the virtual 3D world can correspond to movement in the photographic world as represented by the rendered panoramic images. Further, portions of the neighboring panorama can be automatically rendered within the 3D environment as the virtual camera is moved along the path from the first position to the second position. These additional steps may be performed by, for example, a combination of the components of mapping module 300 of FIG. 3, as described above.

One advantage of embodiments of methods 600 and 700 as described herein is that such embodiments create an immersive 3D experience for a user of a GIS. The user is presented a three-dimensional photographic experience of the real world that is seamlessly integrated with a virtual 3D environment (step 606 and step 706). Further, embodiments enable the user to roam freely through the 3D environment (step 608) so that the user can experience a more natural free-form exploration of the environment than existing systems.

Example Computer System Implementation

Embodiments shown in FIGS. 1-3, 6, and 7, or any part(s) or function(s) thereof, may be implemented using hardware, software modules, firmware, tangible computer readable media having instructions stored thereon, or a combination thereof and may be implemented in one or more computer systems or other processing systems.

FIG. 8 illustrates an example computer system 800 in which embodiments, or portions thereof, may be implemented as computer-readable code. For example, client 110 in FIG. 1 and mapping module 300 of FIG. 3 can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments.

A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the methods illustrated by flowcharts 600 and 700 of FIGS. 6 and 7, respectively, discussed above. Accordingly, such computer programs represent controllers of the computer system 800. Where the invention is implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for rendering and navigating photographic panoramas in an interactive virtual three-dimensional environment, comprising:
    retrieving, using one or more computing devices, a first panoramic image associated with a first geographic location, the first panoramic image having first metadata that includes a first link to one or more panoramic images associated with a second geographic location and a first depth map, the first depth map including a plurality of different depth values, each depth value associated with corresponding image objects at various points within a scene represented by the first panoramic image, wherein each depth value includes represents a respective distance of the corresponding image object from a virtual camera and a respective angle with respect to the direction in which the virtual camera is pointed;
    generating, by the one or more computing devices, a first three-dimensional mesh of polygons for the first panoramic image based on the first depth map associated with the first panoramic image; and
    projecting, by the one or more computing devices, at least a portion of the first panoramic image onto the generated first three-dimensional mesh of polygons to form a first three-dimensional model of the first panoramic image.

2. The method of claim 1, further comprising:
    rendering, by the one or more computing devices, the first three-dimensional model at a first level of detail within the three dimensional environment based on a viewable volume of a current field of view associated with a viewport that displays the three-dimensional environment from a perspective of a virtual camera, wherein the first level of detail is based on a resolution of the first panoramic image.

3. The method of claim 2, further comprising:
    adjusting the viewable volume of a current field of view based on changes to the current field of view.

4. The method of claim 1, wherein the generating the first three-dimensional mesh comprises:
    tessellating the first depth map associated with the first panoramic image to form first three-dimensional geometry for the three-dimensional mesh of polygons, wherein vertices of the first three-dimensional geometry each have depth values based on the plurality of depth values of the first depth map, such that a density of the first three-dimensional mesh of polygons matches a density of the first depth map.

5. The method of claim 4, wherein the tessellating of the first depth map associated with the first panoramic image comprises:
    uniformly tessellating the first depth map to form the first three-dimensional meshes of polygons.

6. The method of claim 4, wherein the tessellating of the first depth map associated with the first panoramic image comprises:
    adaptively tessellating the first depth map according to one or more properties associated with object surfaces represented by the first three-dimensional geometry, the object surfaces corresponding to the image objects in the first scene represented by the first panoramic image.

7. The method of claim 1, further comprising:
    generating a directed graph of linked panoramas based on the first link and additional links associated with the one or more panoramic images, wherein the directed graph guides user navigation among the panoramic images.

8. The method of claim 1, further comprising:
    retrieving, by the one or more computing devices, the one or more panoramic images based on the first metadata of the first panoramic image, the one or more panoramic images being at a second level of detail and having a second depth map corresponding to image objects and second metadata that includes a second link to a third panoramic image associated with a third geographic location;
    generating, by the one or more computing devices, a second three-dimensional mesh of polygons for the one or more panoramic images based on the second depth map associated with the one or more panoramic images, the second depth map including depth values associated with image objects in a second scene represented by the one or more panoramic images;
    projecting, by the one or more computing devices, at least a portion of the one or more panoramic images onto the generated second three-dimensional mesh of polygons to form a second three-dimensional model of the one or more panoramic images; and
    storing, by the one or more computing devices, the second three-dimensional model in a memory so that the second three-dimensional model is available for subsequent incremental streaming in response to a user navigation request to view the second three-dimensional model,
    wherein the retrieving the one or more panoramic images occurs prior to the user navigation request to view the second three-dimensional model to prefetch the one or more panoramic images.

9. The method of claim 8, further comprising:
    wherein the second level of detail is lower than the first level of detail in which the portion of the first three-dimensional model of the first panoramic image is rendered.

10. The method of claim 8, wherein the retrieving of the first panoramic image further comprises retrieving a first set of image tiles associated with the first panoramic image, the first set of image tiles having a first image resolution; and
    wherein the retrieving of the one or more panoramic images further comprises retrieving a second set of image tiles associated with the one or more panoramic images, the second set of image tiles having a second image resolution, wherein the second image resolution is lower than the first image resolution.

11. The method of claim 8 further comprising:
    prefetching, by the one or more computing devices, panoramic images adjacent to the first panoramic image or the one or more panoramic images, the panoramic images having a full resolution, wherein a probability heuristic determines a probability in which the retrieved panoramic images are viewed and the resolution of the panoramic images are reduced based on the probability heuristic.

12. The method of claim 11, wherein a view order heuristic determines a likely order in which the panoramic images are prefetched, the panoramic images sequenced based on the view order heuristic.

13. The method of claim 8, further comprising:
    geo-locating the first panoramic image and the one or more panoramic images within a geographic information system (GIS) based on the respective first and second metadata, wherein the first and second metadata further includes geographic coordinates corresponding to the respective first and second geographic locations associated with first panoramic image and one or more panoramic images, and locations within the three-dimensional environment correspond to geographic locations within the GIS.

14. The method of claim 13, wherein the rendering further comprises:
rendering a three-dimensional overlay with the portion of the first three-dimensional model, the three-dimensional overlay including a navigation control that enables a user to change the virtual camera's position within the three-dimensional environment in order to navigate between locations associated with the first panoramic image and the one or more panoramic images within the three-dimensional environment.

15. The method of claim 14, wherein at least a portion of the metadata is defined by a user in a geographic description language.

16. The method of claim 15, wherein the metadata defines a path to move the camera through the first and second three-dimensional models.

17. The method of claim 14, further comprising:
determining a path along a representation of a street in the three-dimensional environment in response to user input via the navigation control;
moving the virtual camera along the determined path from a first position corresponding to a first location associated with the first panoramic image to a second position corresponding to a second location associated with the one or more panoramic images in the three-dimensional environment; and
automatically rendering at least a portion of the stored second three-dimensional model of the one or more panoramic images at the first level of detail within the three-dimensional environment as the virtual camera is moved along the path from the first position to the second position.

18. The method of claim 17, wherein the automatically rendering comprises:
fading between the rendered portion of the first three-dimensional model of the first panoramic image and the rendered portion of the second three-dimensional model of the one or more panoramic images such that the user is presented a visually smooth transition from the first three-dimensional model to the second three-dimensional model.

19. The method of claim 18, wherein the projecting the first three-dimensional model comprises:
projecting the first set of image tiles onto the generated first three-dimensional mesh of polygons to form a first textured three-dimensional mesh of polygons, wherein the first textured three-dimensional mesh of polygons is rendered at the first image resolution, and
wherein the projecting the second three-dimensional model comprises:
projecting the second set of image tiles onto the generated second three-dimensional mesh of polygons to form a second textured three-dimensional mesh of polygons, wherein the second textured three-dimensional mesh of polygons is stored at the second image resolution.

20. A system for rendering and navigating photographic panoramas in an interactive visual three-dimensional environment, comprising:
an image fetcher configured to retrieve a first panoramic image associated with a first geographic location, the first panoramic image having first metadata that includes a first link to one or more panoramic images associated with a second geographic location and a first depth map, the first depth map including a plurality of different depth values, each depth value associated with corresponding image objects at various points within a scene represented by the first panoramic image, wherein each depth value includes represents a respective distance of the corresponding image object from a virtual camera and a respective angle with respect to the direction in which the virtual camera is pointed;
a polygon generator configured to generate a first three-dimensional mesh of polygons for the first panoramic image based on the first depth;
a renderer module configured to project at least a portion of the first panoramic image onto the generated first three-dimensional mesh of polygons to form a first three-dimensional model of the first panoramic image; and
a graphical user interface (GUI) configured to enable a user to navigate between different views of the rendered first three-dimensional model within the three-dimensional environment.

21. The system of claim 20, wherein the renderer module is further configured render the first three-dimensional model at a first level of detail within the three dimensional environment based on a viewable volume of a current field of view associated with a viewport that displays the three-dimensional environment from a perspective of a virtual camera, wherein the first level of detail is based on a resolution of the first panoramic image.

22. The system of claim 21, wherein the renderer module is further configured to adjust the viewable volume of a current field of view based on changes to the current field of view.

23. The system of claim 20, wherein the image fetcher is further configured to retrieve the one or more panoramic images based on the first metadata of the first panoramic image, the one or more panoramic images having a second depth map corresponding to image objects and second metadata that includes a second link to a third panoramic image associated with a third geographic location,
wherein the polygon generator is further configured to generate a second three-dimensional mesh of polygons for the one or more panoramic images based on the second depth map associated with the one or more panoramic images, the second depth map including depth values associated with image objects in a second scene represented by the one or more panoramic images, and
wherein the renderer module is further configured to project at least a portion of the one or more panoramic images onto the generated second three-dimensional mesh of polygons to form a second three-dimensional model of the one or more panoramic images, and store the second three-dimensional model in a memory at a second level of detail so that it is available for subsequent incremental streaming in response to user navigation requests, wherein the second level of detail is lower than the first level of detail in which the portion of the first three-dimensional model of the first panoramic image is rendered.

24. The system of claim 23, further comprising:
a GIS manager to geo-locate the first panoramic image within a geographic information system (GIS) based on the first metadata, wherein the first metadata further includes geographic coordinates corresponding to the first geographic location, locations within the three-dimensional environment represent geographic locations within the GIS, and movement within the three-dimensional environment corresponds to movement within the GIS.

25. The system of claim 20, wherein the image fetcher is configured to retrieve a first set of image tiles associated with the first panoramic image, the first set of image tiles having a first image resolution, and to retrieve a second set of image tiles associated with the one or more panoramic images, the second set of image tiles having a second image resolution, wherein the second image resolution is lower than the first image resolution.

26. The system of claim 25, wherein the renderer module is configured to project the first set of image tiles onto the generated first three-dimensional mesh of polygons to form a first textured three-dimensional mesh of polygons, wherein the first textured three-dimensional mesh of polygons is rendered at the first image resolution, and to project the second set of image tiles onto the generated second three-dimensional mesh of polygons to form a second textured three-dimensional mesh of polygons, wherein the second textured three-dimensional mesh of polygons is stored at the second image resolution.

27. The system of claim 20, wherein the polygon generator includes a tessellator to tessellate the first depth map associated with the first panoramic image to form first three-dimensional geometry for the three-dimensional mesh of polygons, wherein vertices of the first three-dimensional geometry each have depth values based on the plurality of depth values of the first depth map, such that a density of the first three-dimensional mesh of polygons matches a density of the first depth map.

28. The system of claim 27, wherein the tessellator is configured to uniformly tessellate the first depth map to form the first three-dimensional meshes of polygons.

29. The system of claim 27, wherein tessellator is configured to adaptively tessellate the first depth map according to one or more properties associated with object surfaces represented by the first three-dimensional geometry, the object surfaces corresponding to the image objects in the first scene represented by the first panoramic image.

30. The system of claim 20, wherein the renderer module is further configured to generate a directed graph of linked panoramas based on the first link and additional links associated with the one or more panoramic images, and wherein the directed graph guides user navigation among the panoramic images.

31. The system of claim 20, wherein the image fetcher is further configured to prefetch panoramic images adjacent to the first panoramic image or the one or more panoramic images, the panoramic images having a full resolution, wherein a probability heuristic determines a probability in which the retrieved panoramic images are viewed and the resolution of the panoramic images are reduced based on the probability heuristic.

32. The system of claim 31, wherein the renderer module is further configured to render a three-dimensional overlay with the portion of the first three-dimensional model, the three-dimensional overlay including a navigation control that enables a user to change the virtual camera's position within the three-dimensional environment in order to navigate between locations associated with the first panoramic image and the one or more panoramic images within the three-dimensional environment.

33. The system of claim 32, further comprising:
- a path planner module to determine a path along a representation of a street in the three-dimensional environment in response to user input via the navigation control;
- a path motion module to move the virtual camera along the determined path from a first position corresponding to a first location associated with the first panoramic image to a second position corresponding to a second location associated with the one or more panoramic images in the three-dimensional environment,
- wherein the renderer module is further configured to automatically render at least a portion of the stored second three-dimensional model of the one or more panoramic images at the first level of detail within the three-dimensional environment as the virtual camera is moved along the path from the first position to the second position.

34. The system of claim 33, wherein the renderer module is further configured to fade between the rendered portion of the first three-dimensional model of the first panoramic image and the rendered portion of the second three-dimensional model of the one or more panoramic images such that the user is presented a visually smooth transition from the first three-dimensional model to the second three-dimensional model.

* * * * *